Patented July 14, 1936

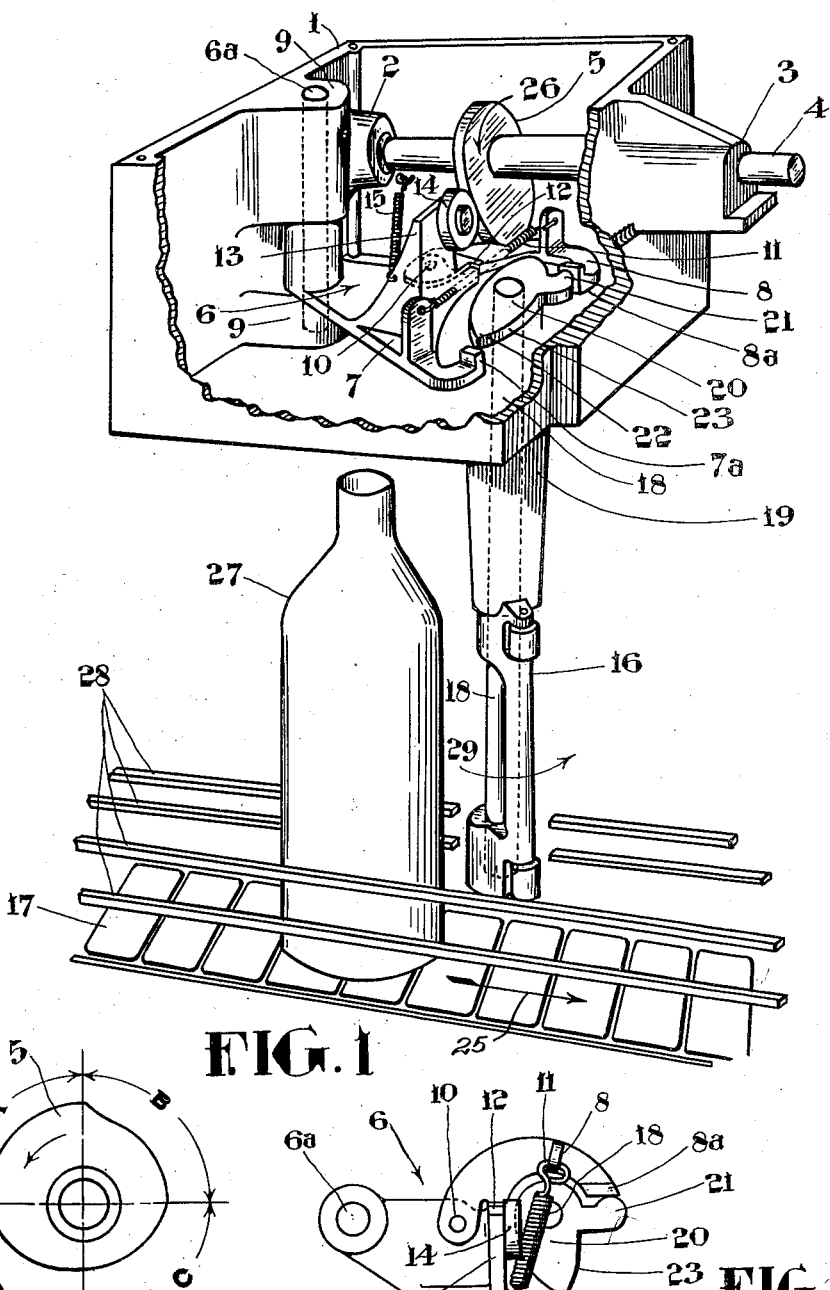

2,047,406

UNITED STATES PATENT OFFICE 2,047,406

TIMING ATTACHMENT FOR CONVEYERS

Bruce G. Copping, Montreal, Quebec, Canada, assignor to Coca Cola Company of Canada Limited, Montreal, Quebec, Canada Application October 1, 1935, Serial No. 43,068

10 Claims. (Cl. 198—34)

This invention relates to conveyers and has for its principal object the provision of improved means for accurately spacing or timing the conveyance of articles to a predetermined point of delivery, for example, the entrance to a machine or conveyer to which it is desirable or necessary that the articles be successively delivered at suitably timed intervals.

Other objects, advantages and characteristic features of the invention will be more readily understood from the following detailed description taken in connection with the accompanying drawing, in which Figure 1 is a perspective view of the spacing or timing means provided in accordance with this invention.

Figure 2 is a detailed view of the main cam and cam roller forming part of the assembly appearing in Figure 1.

Figure 3 is a top plan view of the yoke and gate shaft cam appearing in Fig. 1.

Referring more particularly to the drawing, 1 designates a housing equipped with bearings 2 and 3 in which the main cam shaft 4 is rotatably journalled. A main cam 5 is fixed to rotate with shaft 4 and is located in the housing 1 between the shaft bearings 2 and 3.

The profile of cam 5 is a particularly important feature of the present invention. As shown in Figure 2 the radius of the cam is constant throughout section A and is at the maximum in this section. The radius throughout section B is also constant but slightly less than that of section A. In section C the radius decreases steadily from the radius of section B to the minimum radius. In section D the radius increases steadily from the minimum radius to the radius of section A. The degrees of revolution included in any one of the four sections A, B, C, and D may be varied to give the exact timing required in any particular case.

The cam 5 cooperates with a yoke assembly generally indicated at 6. This assembly is mounted to swing about a pivot 6a and includes a pair of hingedly connected arms 7 and 8, hereinafter termed the gate opening and closing arms. The pivot 6a passes through one end of arm 7 and is permanently secured in suitable brackets 9. One end of arm 8 is fastened, by a pivot 10, to an intermediate portion of arm 7. At their free ends the arms 7 and 8 are formed to provide jaws 7a and 8a. A spring 11 holds the gate closing arm 8 against a stop 12 which determines the minimum distance between the jaws 7a and 8a. This spring is sufficiently powerful to hold the gate closing arm 8 in contact with the stop 12, except when the arm 8 is subjected to abnormal pressure tending to swing it outwardly about the pivot 10. A bracket 13 cast integral with the arm 7 carries a cam roller 14 which is held against the cam 5 by a spring 15.

During rotation of shaft 4 the yoke assembly 6 is swung back and forth about the pivot 6a by means of cam 5, cam roller 14, and spring 15. This motion of the yoke assembly is utilized to control the opening and closing of a gate 16 which is mounted to swing from a closed position extending across the upper run of an endless conveyer 17 to open position at one side of said conveyer. As here shown the gate 16 is fixed to the lower end of a rotary gate shaft 18 which extends upwardly into the housing 1 through a suitable supporting bearing 19. A duck-shaped cam 20 is fixed to the upper end of shaft 18 and lies between the yoke arms 7 and 8.

The location of cam 20 with reference to the arms 7 and 8 of the yoke assembly 6 is a particularly important feature of the present invention. In Fig. 3 the yoke assembly 6 is shown at the limit of its swinging movement in a clockwise direction. In this position of the yoke the head 21 of the duck-shaped cam 20 is in contact with the closing arm jaw 8a while the tail tip 22 of said cam is spaced inwardly a slight distance from the opening arm jaw 7a. The curved back portion 23 of cam 20 lies on an arc drawn about the center of the pivot 6a and having a radius slightly less than the radius of the inner side of the opening arm jaw 7a.

In describing the complete operation it will be assumed that the conveyer 17 is moving at a constant rate of speed in the direction indicated by the arrow 25 and that the main shaft 4 is continuously rotating in the direction indicated by the arrow 26. It will also be assumed that the conveyer is being utilized to deliver cylindrical objects, such as the bottle 27, to a predetermined point of delivery in accordance with this invention, lateral displacement of the bottle or other object being guarded against by the provision of suitable guides 28.

During the period that section A of the main cam 5 is in contact with the cam roller 14 the yoke assembly 6 is at the extreme limit of its travel in a clockwise direction. In this position of the yoke the closing arm jaw 8a is engaged with the head 21 of the duck-shaped cam 20 and prevents rotation of the gate 16 and gate shaft 18 in the direction indicated by the arrow 29. The gate 16 is thus held in a closed position across the conveyer 17 to prevent passage of the bottle 27 beyond the gate. In this connection it may be noted that the spring 11 is sufficiently strong to prevent outward swinging movement of the arm 8 due to any normal gate opening pressure exerted on the gate by the bottle 27.

When the section B of main cam 5 is rotated into contact with the cam roller 14 the decreased radius of this section as compared with section A permits the spring 15 to swing the yoke assembly a limited distance in an anti-clockwise direction so that the closing arm jaw 8a is withdrawn a short distance from the head 21 of cam 20 while the opening arm jaw 7a is moved to a position where there is just enough clearance between this jaw and the tail tip 22 of cam 20 to permit the gate 16 to swing in the direction of the arrow 29 until the head 21 of cam 20 again contacts the closing arm jaw 8a. This limited opening movement of the gate is not sufficient to permit the passage of the bottle 27 but is just sufficient to position the tail tip 22 of cam 20 in front of the opening arm jaw 7a.

Assuming that the bottle 27 reaches the gate 16 during the time section B of cam 5 is in contact with the cam roller 14 the pressure of the bottle will cause the gate 16 and the cam 20 to swing in the direction of the arrow 29 until the duck cam head 21 contacts the closing arm jaw 8a and the duck cam tail tip 22 swings over in front of the opening arm jaw 7a.

If, however, the bottle 27 does not reach the gate 16 during the time section B of main cam 5 is in contact with the cam roller 14 there will be no motion of the gate 16 or the duck cam 20. Consequently cam 20 will remain in the position shown in Figure 3.

When section C of cam 5 is rotated into contact with cam roller 14 the gradually decreasing radius of this section permits the pull of spring 15 to swing the yoke assembly in an anti-clockwise direction until said assembly reaches its limit of travel in this direction when that end of section C representing the minimum radius of cam 5 is in contact with roller 14.

If, during the time that section B of cam 5 was in contact with the cam roller 14, the bottle 27 has engaged the gate 16 and swung the duck cam tip 22 to a position in front of the opening arm jaw 7a then, as the yoke assembly 6 swings to the limit of its movement in an anti-clockwise direction (which occurs during contact of section C of main cam 5 with cam roller 14) the opening arm jaw 7a will engage and move the tail tip 22 of cam 20 to rotate gate 16 in a counter-clockwise direction until the gate reaches its fully open position as the end of section C of cam 5 comes into contact with the roller 14. This full opening movement of gate 16 permits the bottle 27 to pass therebeyond.

If the bottle 27 has not contacted the gate 16 during the time that section B of cam 5 is in contact with cam roller 14 then cam 20 will still be in the original position shown in Figure 3 when section C of cam 5 is rotated into contact with roller 14. In this case the swinging movement of the yoke assembly to the limit of its travel in an anti-clockwise direction will cause no gate opening movement of the cam 20 since the gate opening arm 7 will pass outside the tip 22 and curved portion 23 of cam 20. As it passes over the curved portion 23 of the cam 20 the opening arm jaw 7a serves as a stop preventing anti-clockwise rotation of cam 20 from the position shown in Figure 3. The gate 16 is thus held against opening movement in response to pressure exerted thereon by the bottle 27.

From the foregoing it will be seen that full opening movement of gate 16 is possible only when section C of cam 5 is in contact with the cam roller 14 and that, for such full opening of the gate to take place during this relative positioning of the cam 5 and roller 14, there must have been a previous partial opening or setting movement of the gate by pressure of a bottle reaching the gate during contact of section B of cam 5 with roller 14. It will also be noted only a slight pressure of the bottle 27 upon the gate 16 is required to set the gate during the period that section B of cam 5 is in contact with roller 14 and that subsequent movement of the gate to its fully opened position is effected by the gate opening arm 7 as the latter is moved to the end of its travel in an anti-clockwise direction. The use of the yoke 6 instead of the bottle 27 for swinging the gate to its fully opened position eliminates the danger of any retardation to the travel of the bottle (after the instant of release) through the drag of the gate. It will also be seen that, with the use of the mechanism herein described, the release of the bottle 27 by the gate 16 occurs at exactly the same instant in every cycle.

When section D of cam 5 is rotated into contact with cam roller 14 the yoke assembly 6 is caused to swing from the limit of its movement in an anti-clockwise direction to the limit of its movement in the reverse or clockwise direction. Assuming that the cam 20 is in a position corresponding to the fully open position of the gate 16 this clockwise motion of the yoke assembly 6 will move the closing arm jaw 8a into contact with the head 21 of cam 20 so that the latter is returned to the position shown in Figure 3, which represents the position occupied by cam 20 when the gate 16 is in its closed position extending across the conveyer 17.

If the cam 20 has remained in the original position shown in Figure 3 during contact of sections A, B and C of cam 5 with cam roller 14 then the clockwise movement of yoke 6 which takes place during contact of section D with cam roller 14 will have no effect on cam 20 but will merely bring the arms 7 and 8 of the yoke back to the position of Figure 3.

In practice the rate at which the gate 16 is opened and closed is regulated so that the extent of opening is suitable to the rate of travel of the bottle 27 while closure of the gate occurs before the following bottle reaches the gate. This timing of the opening and closing movements of the gate is achieved by varying the length of sections C and D of the main cam 5.

It has been previously stated that spring 11 will yield to permit outward swinging movement of the gate closing arm 8 about its pivot 10 when said arm is subjected to abnormal pressure. This is necessary in case some object, lying on the conveyer 17, prevents clockwise movement of the gate 16 and cam 20 during the period that section D of cam 5 is in contact with the roller 14. Being prevented from moving in a clockwise direction the head 21 of cam 20 offers solid resistance to clockwise motion of the yoke assembly 6 but the ability of the closing arm 8 to swing away from the stop 12 due to yielding of the spring 11 prevents damage to the mechanism.

Having thus described what I now conceive to be the preferred embodiment of this inven- tion it will be understood that various modifications may be resorted to within the scope and spirit of the appended claims.

Having thus described my invention, what I claim is:—

1. In apparatus of the character described, the combination of a conveyer, a gate mounted to swing from a closed position across the path of articles on the conveyer to an open position at one side of said path, a timing shaft, gate actuating means movable to "gate closing", "gate setting", and "gate opening" positions in response to each revolution of said shaft, said actuating means serving to permit a slight "setting" movement of the gate from its fully closed position when an article on the conveyer is carried into contact with the gate at a time when the gate actuating means is in its "gate setting" position, an element movable into the path of a gate opening part of said actuating means in response to the "setting" movement of the gate whereby said element is acted on by the gate actuating means to swing the gate to a fully opened position as the gate actuating means moves from its "gate setting" to its "gate opening" position, said gate actuating means also including a gate closing part adapted to act against said element to swing the gate from an open to a closed position during movement of the gate actuating means from its "gate opening" to its "gate closing" position.

2. Apparatus as claimed in claim 1 in which the gate closing part of said gate actuating mechanism is yieldable to prevent breakage when abnormal resistance is offered to the closing movement of the gate.

3. Apparatus as claimed in claim 1 in which the gate remains in its fully closed position during the gate opening movement of the gate actuating means in the event that there has been no "setting" movement of the gate during the preceding "gate setting" position of the actuating means.

4. Apparatus as set forth in claim 1 characterized in that, during the gate opening movement of said actuating means, the gate will remain in its fully closed position and will be locked in such position by said actuating means if there has been no "setting" movement of the gate during the "gate" setting position of the actuating mechanism.

5. Apparatus as set forth in claim 1 in which the movement of the gate actuating means is controlled by a cam fixed to rotate with the timing shaft, the profile of said cam being such as to cause the gate actuating means to assume its previously mentioned positions at regularly recurring intervals.

6. Apparatus as set forth in claim 1 in which the said element comprises a cam fixed to swing with the gate.

7. Apparatus as set forth in claim 1 in which the gate actuating means comprises a swingably mounted yoke presenting arms constituting the aforesaid gate opening and closing parts.

8. Apparatus as set forth in claim 1 in which the gate actuating means comprises a swingably mounted yoke presenting a pair of arms constituting the aforesaid gate opening and closing parts and in which the element acted on by said parts comprises a cam fixed to rotate with the gate.

9. Apparatus as set forth in claim 1 in which the gate actuating means comprises a cam fixed to the timing shaft, a swingably mounted yoke controlled by said cam and presenting a pair of arms constituting the aforesaid gate opening and closing parts, said apparatus being further characterized in that the element acted on by said gate opening and closing parts comprises a cam fixed to rotate with the gate.

10. Apparatus as set forth in claim 1 in which the gate actuating means comprises a swingably mounted yoke presenting a pair of arms constituting the aforesaid gate opening and closing parts and in which oscillating movement is imparted to said yoke by means of a cam fixed to the timing shaft and engaging a part of the yoke.

BRUCE G. COPPING.